(12) United States Patent
Peard et al.

(10) Patent No.: US 12,498,101 B2
(45) Date of Patent: Dec. 16, 2025

(54) OPTICAL ASSEMBLY FOR A SPOTLIGHT, AND SPOTLIGHT COMPRISING SUCH AN OPTICAL ASSEMBLY

(71) Applicant: AYRTON, Villebon-sur-Yvette (FR)

(72) Inventors: Yvan Peard, Antony (FR); Cyril Union, Fromont (FR)

(73) Assignee: AYRTON, Villebon-sur-Yvette (FR)

( * ) Notice: Subject to any disclaimer, the term of this patent is extended or adjusted under 35 U.S.C. 154(b) by 47 days.

(21) Appl. No.: 18/014,003

(22) PCT Filed: Jun. 25, 2021

(86) PCT No.: PCT/FR2021/051174
§ 371 (c)(1),
(2) Date: Dec. 30, 2022

(87) PCT Pub. No.: WO2022/003283
PCT Pub. Date: Jan. 6, 2022

(65) Prior Publication Data
US 2023/0288043 A1    Sep. 14, 2023

(30) Foreign Application Priority Data
Jul. 1, 2020 (FR) ...................................... 2006942

(51) Int. Cl.
*F21V 5/00* (2018.01)
*F21V 11/06* (2006.01)
(Continued)

(52) U.S. Cl.
CPC .............. *F21V 5/007* (2013.01); *F21V 5/004* (2013.01); *F21V 11/06* (2013.01); *F21Y 2105/18* (2016.08); *F21Y 2115/10* (2016.08)

(58) Field of Classification Search
CPC ........... F21V 5/004; F21V 5/007; F21V 11/06
See application file for complete search history.

(56) References Cited

U.S. PATENT DOCUMENTS

| 4,083,626 A * | 4/1978 | Miyahara ................ B32B 27/08 |
| | | 359/453 |
| 2012/0091917 A1* | 4/2012 | Vinther .................. H05B 45/00 |
| | | 315/312 |

(Continued)

FOREIGN PATENT DOCUMENTS

EP    3 564 578 A1    11/2019

OTHER PUBLICATIONS

International Search Report and Written Opinion for Application No. PCT/FR2021/051174 dated Oct. 6, 2021.

*Primary Examiner* — Erin Kryukova
*Assistant Examiner* — Nathaniel J Lee
(74) *Attorney, Agent, or Firm* — Jenkins, Taylor & Hunt, P.A.

(57) ABSTRACT

The present invention relates to an optical assembly for a spotlight, comprising:
an optical element equipped with a set of lenses, said lenses being adapted to cooperate with a first group of light sources for said spotlight, such as LEDs, wherein said lenses are adapted to generate primary light beams and are spaced apart from one another using inter-lens spaces,
a grille for filling at least part of said inter-lens spaces of said set of lenses, adapted to cooperate with a second group of light sources for said spotlight, such as LEDs, wherein said grille is adapted to generate a secondary light effect, and
a support element, adapted to support the set of lenses, in the inter-lens spaces,
wherein the grille and support element are adapted to be superimposable, enclosing the optical element between the (Continued)

inner face of the grille and the upper face of the support element, thereby fixing the set of lenses in order to form the optical assembly.

8 Claims, 5 Drawing Sheets

(51) Int. Cl.
*F21Y 105/18* (2016.01)
*F21Y 115/10* (2016.01)

(56) References Cited

U.S. PATENT DOCUMENTS

| | | | |
|---|---|---|---|
| 2012/0134151 A1* | 5/2012 | Jurik | F21V 14/06 |
| | | | 362/235 |
| 2015/0316229 A1* | 11/2015 | Jurik | F21V 7/0083 |
| | | | 362/237 |
| 2017/0122542 A1 | 5/2017 | Shum | |
| 2020/0088382 A1 | 3/2020 | Hinrichs et al. | |

\* cited by examiner

[Fig. 1]
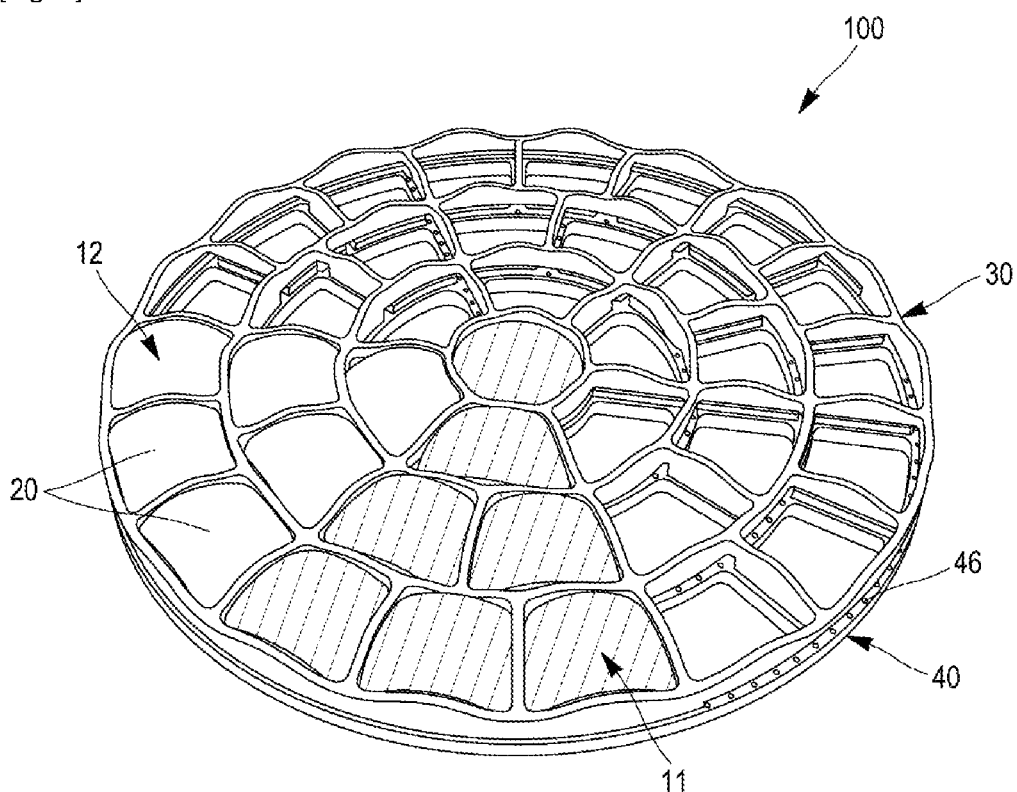
[Fig. 2]
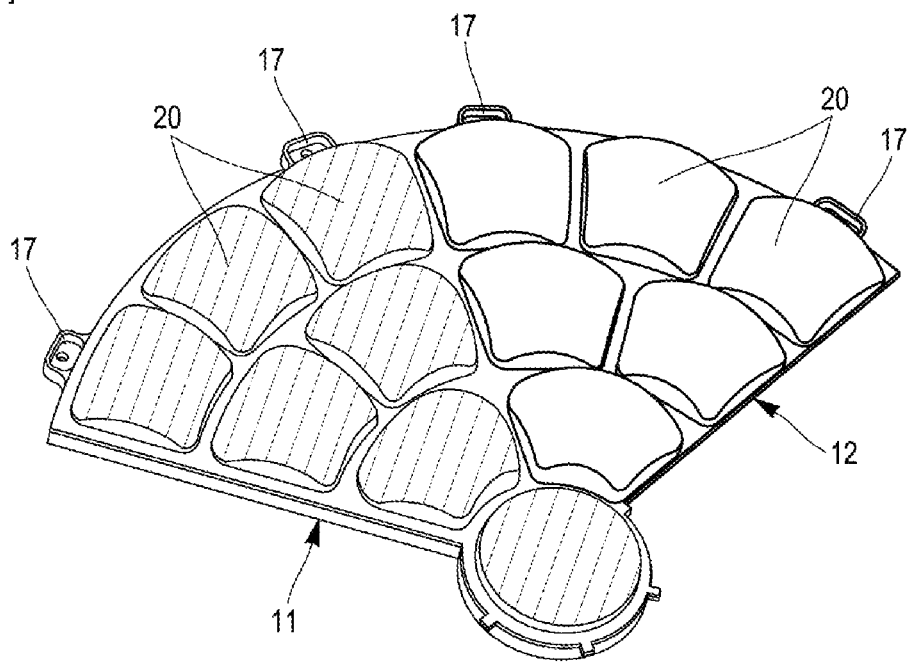

[Fig. 3]
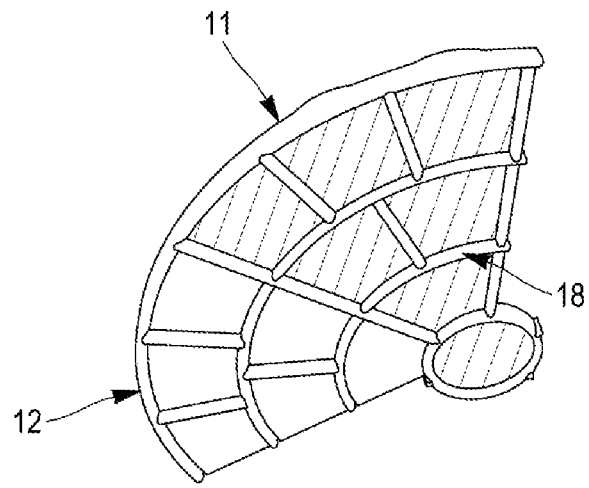
[Fig. 4]
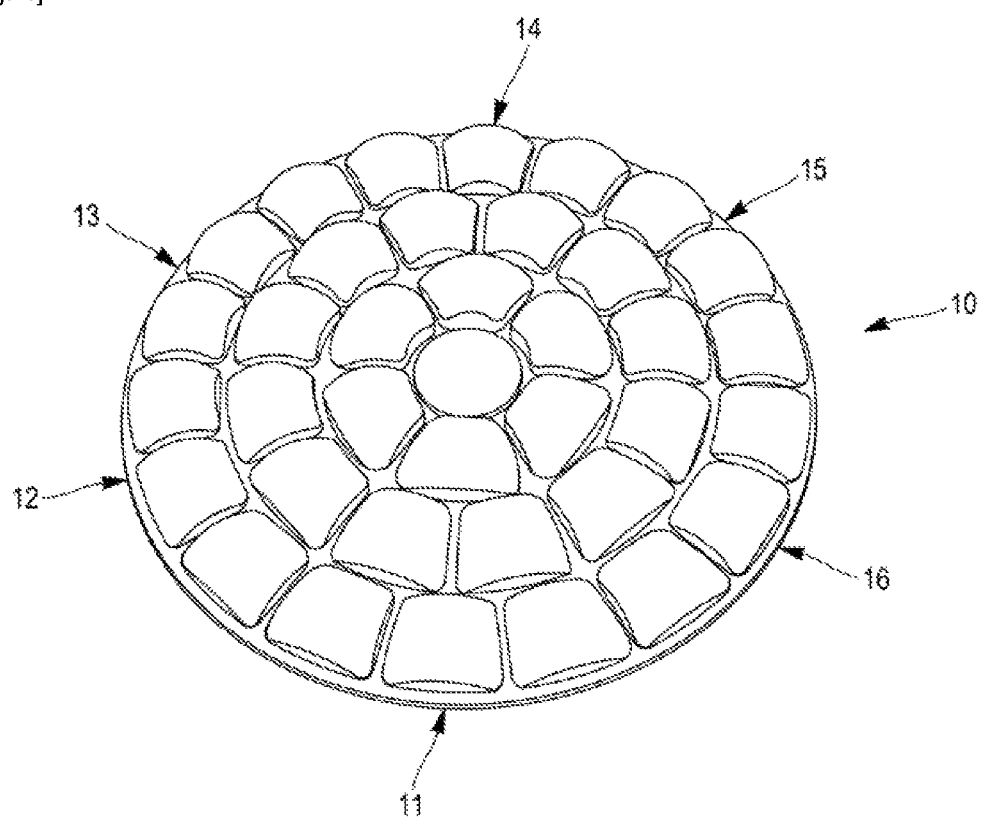

[Fig. 5]
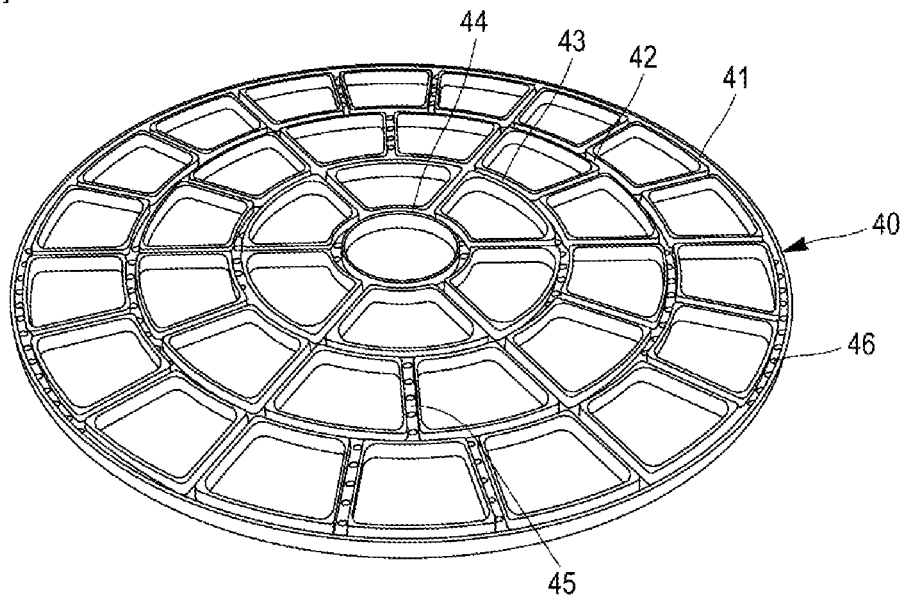
[Fig. 6]
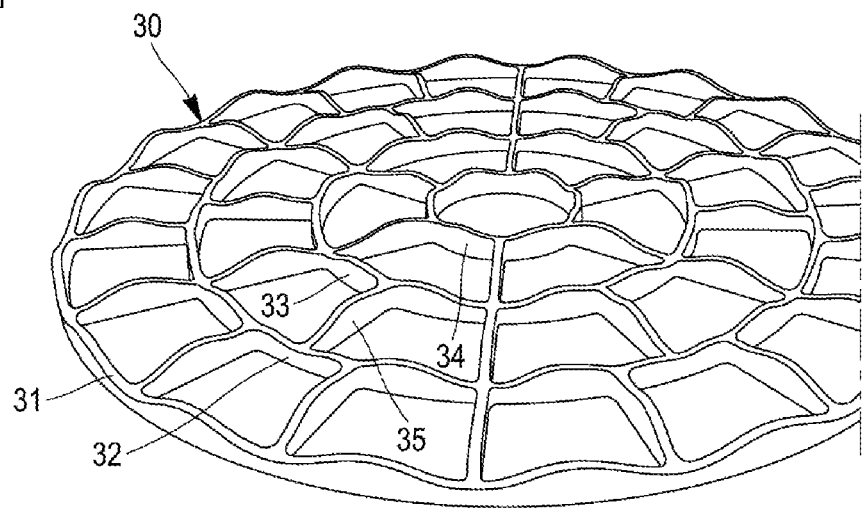

[Fig. 7]
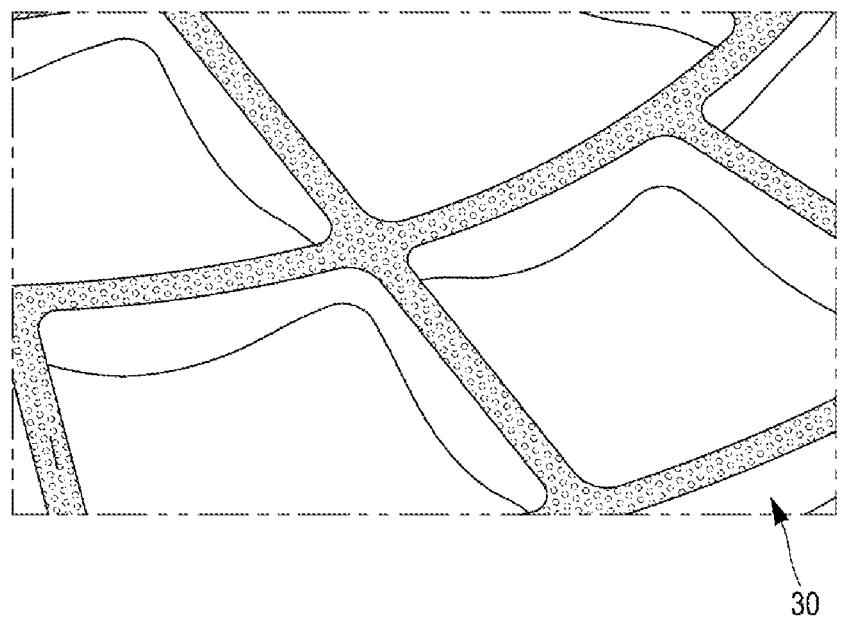
[Fig. 8]
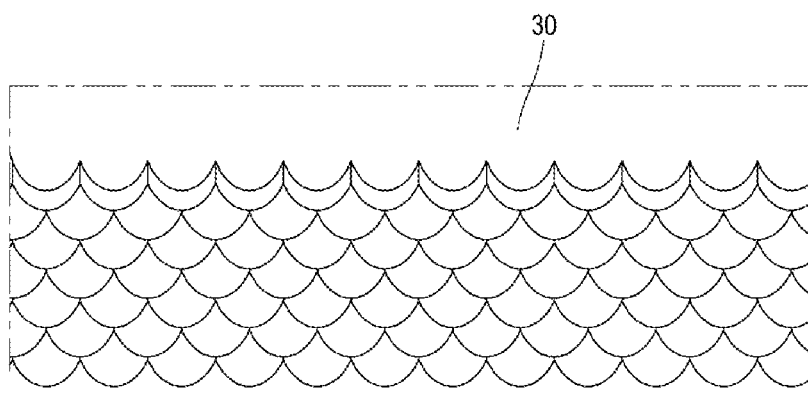

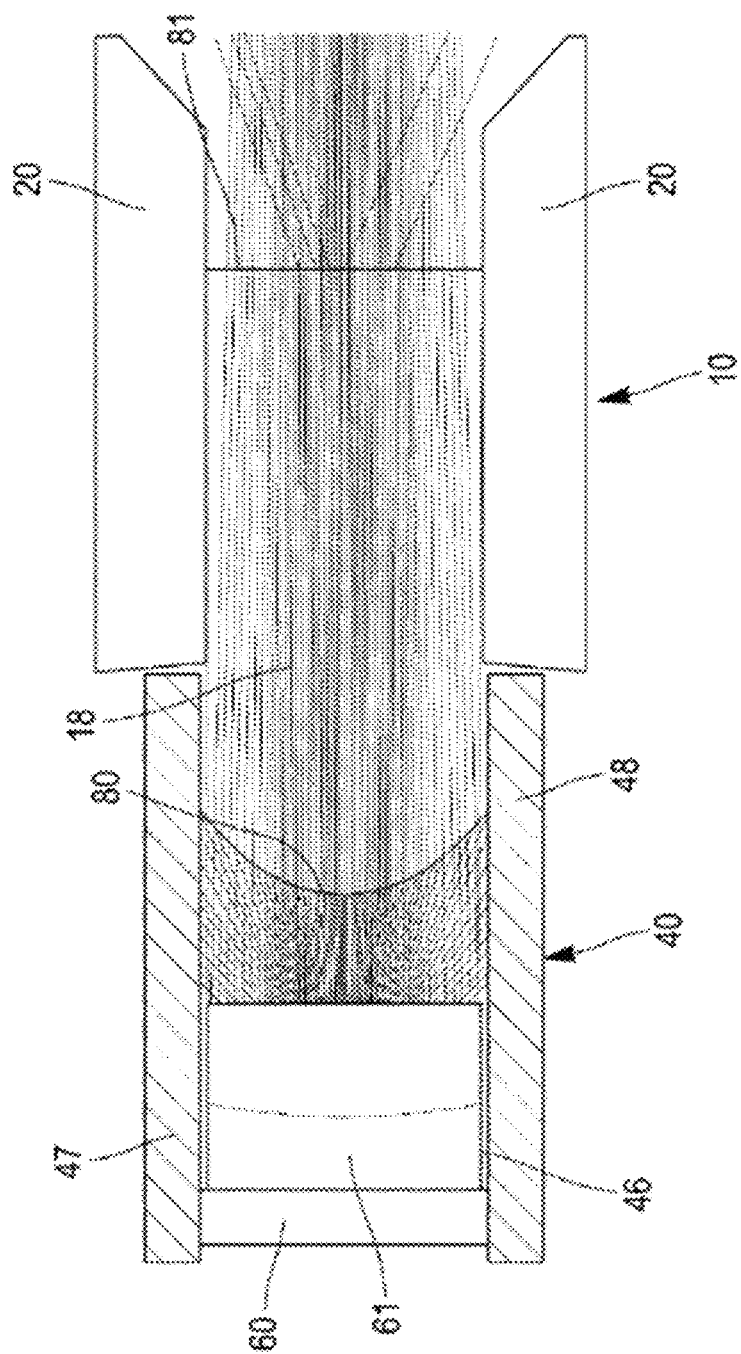
[Fig. 9]

OPTICAL ASSEMBLY FOR A SPOTLIGHT, AND SPOTLIGHT COMPRISING SUCH AN OPTICAL ASSEMBLY

TECHNICAL FIELD

The present invention relates to an optical assembly intended for a spotlight, comprising an optical element equipped with a set of lenses, said lenses being suitable for cooperating with a first group of light sources for said spotlight, such as light-emitting diodes (LEDs), said lenses being suitable for generating primary light beams and being spaced apart from one another using inter-lens spaces, said assembly also comprising a grille making it possible to bridge at least part of said inter-lens spaces of said set of lenses, and being adapted to cooperate with a second group of light sources for said spotlight, such as light-emitting diodes (LEDs), wherein said grille is adapted to generate secondary light beams.

BACKGROUND

The optical assembly designed for a spotlight according to the invention is particularly suitable for spotlights comprising a group of light sources, such as light-emitting diodes (LEDs), the spotlights being adapted to generate primary light beams using said light sources, and also comprising a set of lenses.

Primary light beams, possessing characteristics stipulated by the user, can be obtained on the one hand through the shape of the lenses, and on the other hand through the distance between the lenses and light sources.

As a general rule, and in order to ensure optimal operation of the assembly composed of the light sources and lenses, the lenses present in a set of lenses are spaced in relation to other by means of inter-lens spaces. The lenses can be fastened individually in a support structure, or interconnected to form a set of "monobloc" lenses.

When using a spotlight such as described above, the light beams created using said spotlight are visible. However, the inter-lens spaces are not generally used for the purpose of generating specific light effects.

Spotlights which have a surface covered with a certain quantity of individual lenses are known in the prior art. The inter-lens spaces of said spotlights, which are relatively numerous, make it possible to use secondary light sources, used to obtain a diffuse light by means of secondary light sources. The term "signage" is used to refer to this type of light effect.

One of the main drawbacks of spotlights known in the prior art lies in the fact that a relatively large space is required in order to be able to accommodate secondary light sources in the inter-lens spaces. This results in the inter-lens spaces occupying a relatively large space in relation to the space occupied by the set of lenses.

In view of the observations above, the aim of the present invention consists in proposing an optical assembly for a spotlight, whose optical element is used with a set of lenses, said lenses being spaced apart from one another via inter-lens spaces, and wherein the surface area required for the inter-lens spaces is limited in relation to the surface area required for the lenses.

This makes it possible to obtain a more favourable ratio between the surface area occupied by the lenses and the surface area occupied by the inter-lens spaces, in comparison with the spotlights disclosed in the prior art.

SUMMARY

The object of the invention relates to an optical assembly for a spotlight, comprising:
- an optical element equipped with a set of lenses, said lenses being suitable for cooperating with a first group of light sources for said spotlight, such as LEDs, wherein said lenses are adapted to generate primary light beams and are spaced apart from one another using inter-lens spaces,
- a grille for filling at least part of said inter-lens spaces of said set of lenses, adapted to cooperate with a second group of light sources for said spotlight, such as LEDs, wherein said grille is adapted to generate a secondary light effect, and
- a support element, adapted to support the set of lenses, in the inter-lens spaces, wherein the grille and support element are adapted to be superimposable, enclosing the optical element between the inner face of the grille and the upper face of the support element, thereby fixing the set of lenses in order to form the optical assembly.

According to an embodiment of the invention, the grille is adapted to surround each lens in the set of lenses.

According to an embodiment of the invention, the grille comprises a transparent plastic material.

According to an embodiment of the invention, the grille, on the face directed towards the second group of light sources, comprises a built-in diffusing texture making it possible to obtain fragmented secondary light beams.

According to an embodiment of the invention, the lenses are shaped so that together they form a disc.

According to an embodiment of the invention, the optical element comprises at least two modules, each module comprising at least one lens.

According to an embodiment of the invention, the support element comprises an opaque material, preferably a black material, and comprises orifices suitable for housing the light sources of said second group of light sources, the support element thereby forming a mask for said light sources.

According to a second aspect of the invention, the invention relates to a spotlight comprising a first group of light sources, such as LEDs, adapted to cooperate with a set of lenses in order to generate primary light beams, said spotlight lenses being spaced apart from one another using inter-lens spaces, and a second group of light sources, such as LEDs, adapted to cooperate with a grille present in said inter-lens spaces in order to generate a secondary light effect, the spotlight comprising the optical assembly according to the invention.

BRIEF DESCRIPTION OF THE DRAWINGS

The aim, object and characteristics of the invention will appear more clearly upon reading the description below drawn up with reference to the figures wherein:

FIG. 1 shows a perspective view of part of the optical assembly, with the grille and support element of the optical assembly according to the invention, FIG. 2 represents a perspective view of the upper face of two modules of the optical element, FIG. 3 illustrates a perspective view of the lower face of two modules of the optical element according to FIG. 2, FIG. 4 shows the optical element in its entirety, FIG. 5 represents a perspective view of the support element, FIG. 6 represents a perspective view of the upper face of the grille, FIG. 7 represents a perspective view of the lower face of the grille, FIG. 8 represents a close-up view of part of the lower face of the grille, and FIG. 9 illustrates a cross-sectional view of part of a spotlight comprising the optical assembly according to the invention.

DETAILED DESCRIPTION

FIG. 1 shows a part of the optical assembly 100 according to the invention. For reasons of clarity, part of said optical assembly 100 is not visible, in order to show more clearly the various constituent parts of the optical assembly 100.

The optical assembly 100 comprises, first of all, an optical element 10 (see FIG. 4) equipped with a set of lenses 20. As represented in FIG. 1, the optical assembly 100 has thirty-seven lenses 20 distributed around a central lens 20, which is respectively surrounded by three concentric circles of 6, 12 and 18 lenses 20. In the example in FIG. 1, the optical element comprises a first module 11 and a second module 12. Module 11 comprises in total seven lenses 20, including the central lens 20, a first lens in the first circle, two lenses in the second circle and three lenses in the third circle. Module 12 comprises six lenses 20, including a first lens in the first circle, two lenses in the second circle and three lenses in the third circle. Four other modules 13, 14, 15, 16 (not visible in FIG. 1), similar to module 12, are required to complete the optical element 10 and ultimately obtain the thirty-seven lenses 20 mentioned above. The two modules 11 and 12 are described in more detail in FIGS. 2 and 3. Modules 11, 12, 13, 14, 15 and 16 are represented as a whole in FIG. 4.

Each lens 20 of the optical element 10 is suitable for cooperating with a light source which is part of a first group of light sources. Power light-emitting diodes (LEDs) are particularly suitable light sources for use in the optical assembly 100 according to the invention. Via an electronic control, the user can manage the intensity and colour produced by said light-emitting diodes (LEDs). The combination of light-emitting diodes (LEDs) and lenses makes it possible to obtain light beams out of the spotlight using the optical assembly 100.

Using the assembly composed of a light-emitting diode (LED) and a lens 20 to obtain a light beam is known to the prior art, and is not described in detail in the present description.

As represented in FIG. 1, the lenses 20 of the optical element 10 are spaced apart from one another using inter-lens spaces, said spaces being clearly visible in FIG. 4. According to the invention, the inter-lens spaces, or at the very least part of them, are bridged using a grille 30, said grille 30 being represented in detail in FIGS. 6, 7 and 8. The grille 30 is made from a transparent material, for example a transparent plastic material, such as transparent polycarbonate. The grille 30 is adapted to surround each lens 20 in the optical element 10. The width of the grille elements 30 surrounding the lenses 20 is approximately 5 mm. As illustrated in FIG. 1, the height of the grille elements 30 surrounding the lenses 20 varies, in order to best bridge the inter-lens spaces.

The present description refers to a spotlight equipped with thirty-seven lenses 20, combining to form a cylindrical-shaped spotlight. It should be noted that it is possible to use a completely different quantity of lenses 20 in order to produce a given shape. A set of lenses may, for example, form either a rectangle, or a square, or any other suitable shape. The shape of the lenses 20 may be adapted to the overall shape of the spotlight. To obtain, for example, a square shape, the lenses 20 may be square-shaped.

As illustrated in FIG. 1, the optical assembly 100 also comprises a support element 40 suitable for supporting the set of lenses 20 in the inter-lens spaces. As can be seen in FIG. 1, the grille 30 and the support element are 40 adapted so that the branches, constituting respectively the grille 30 and the support element 40, are in the inter-lens space of the lenses 20.

The shape of the grille 30 and the support element 40 makes it possible for the set of lenses 20 to generate primary light beams, the light sources of which are present in a spotlight, though without the presence of said grille 30 and support element 40 being an obstacle to the flow of light generated using a first group of light sources. In their functionality, the grille 30 and support element 40 are adapted to fit onto the opposite faces of the optical element 10, and thereby fixing the set of lenses 20 between the grille 30 and the support element 40, thereby obtaining the optical assembly 100 according to the present invention.

As explained in more detail, with reference to FIG. 9, the main aim of the invention consists in using the surface of the outlet of a spotlight, which is occupied by the inter-lens spaces of the optical assembly 100, in order to create a secondary light effect, complementing the primary light beams generated by the lenses 20, using the grille 30 and a second group of light sources 61 present in a spotlight. Signage light-emitting diodes (LEDs) are particularly suitable light sources for forming this second group of light sources 61. To this end, the second group of light sources 61 is positioned in the spotlight so that each light source of said second group of light sources 61 is situated inside an orifice 46 provided to this end inside the support element 40. The various orifices 46 provided to accommodate each of the light sources are more clearly visible in FIG. 5. The light generated thanks to said second group of light sources 61 is emitted in the direction of the grille 30, and is diffused, in the form of a secondary light effect, and complements the primary light beams emitted by the lenses 20.

The term "secondary light effect" is used in the present description to refer to the second group of light sources 61, but also to refer to the light effect produced using the light sources 61, preferably in the form of signage light-emitting diodes (LEDs). Said second light effect is a diffuse light which emerges from the surface of the grille 30.

A spotlight making it possible to obtain on the one hand primary light beams, and on the other hand a diffuse light as described above, offers the possibility of obtaining light effects from a spotlight equipped with an optical assembly 100 according to the invention, said light effects not being obtainable using spotlights within the prior art.

Initially, a user may use the optical assembly 100 for the purpose of obtaining primary light beams thanks to the combination of a first group of light sources and lenses 20. Complementing or instead of this primary light beam, the user may use the second group of light sources 61 in combination with the grille 30, in order to generate a diffuse light over all or part of the surface of the optical assembly 100. The combination of the second group of light sources 61 and the grille 30 may make it possible to generate static light effects where the light sources are switched on or off on part of the optical assembly 100. Alternatively, the light sources of said second group of light sources 61 may be switched on sequentially, making it possible to generate dynamic light effects, which may form spiral circles or complex shapes on the upper face of the grille 30.

It should be understood that the user may, if they wish, gradually modify either the intensity of the light sources or the colour of said light sources, or both. Thanks to such management of the light sources, "liquid" light effects can be obtained, which means that the transitions and changes generated on said light effects are smooth and gradual.

It is not possible to use the same printed circuit to fix the first group of light sources and the second group of light sources. The second printed circuit has the same shape as the grille 40.

It should be noted that with suitable light sources, such as light-emitting diodes (LEDs), the user may not only modify the intensity but also the colour of the light generated using the light sources. Bearing in mind the possibility of controlling the activation of the various light sources, the intensity and colour obtained by each light source, the user has a great variety of possibilities for generating new and specific light effects.

FIG. 2 illustrates in more detail the first module 11 and the second module 12 of the optical element 10. In FIG. 2, we can clearly distinguish the first module 11 comprising six lenses 20, forming part of the various circles of lenses visible in FIG. 1, as well as the central lens 20 of said optical element 10. For its part, module 12 comprises six lenses 20. According to the embodiment illustrated in FIG. 2, each of the two modules is equipped with "lug" fastenings 17. Said lug fastenings 17 are optional, and so can be used to fix modules 11 and 12 on a support, by means of screws for example.

FIG. 3 represents a perspective view of the lower face of modules 11 and 12, each of which comprises protuberances in the form of a longitudinal light guide 18. Said longitudinal light guides 18 are situated in the inter-lens spaces present on the upper face of modules 11 and 12. It should be noted that the longitudinal light guides 18 have a major effect in terms of guiding the light generated by the light sources of the second group of light sources in a spotlight toward the outlet of said spotlight. In the direction of the light sources of the second group of light sources, the longitudinal light guides 18 are equipped with a convergent profile, said profile being suitable for channelling the useful light produced by said light sources of the second group of light sources towards the surface of the inter-lens optical element. This operation is illustrated in more detail in FIG. 9.

Preferably, it should be noted that the light sources used for the second group of light sources are equipped with very small-sized light-emitting diodes (LEDs). As indicated above, it is possible to control the LEDs individually. This makes it possible to restrict the space required to accommodate said light sources. Furthermore, the light-emitting diodes (LEDs) of this type, namely very small-sized, can generate light effects with a very smooth transition.

FIG. 4 illustrates the optical element 10 of the optical assembly 100 in its entirety. FIG. 4 shows that after assembling the various modules, a single optical element 10 is obtained, equipped with a total of 37 lenses and inter-lens spaces visible in said FIG. 4.

It should be noted that, according to one embodiment, it is perfectly possible to make the optical element 10 monobloc, for example a transparent plastic monobloc, such as transparent polycarbonate. According to the examples illustrated in FIGS. 1, 2 and 3, various modules 11 and 12 are used in order to limit the size of the mould to be used for making said modules. Alternatively, it is clear to the person skilled in the art that there are other options, for example using two halves to obtain a final optical element 10.

FIG. 5 represents the support element 40 adapted to support, on its lower face, the optical element 10 as shown in FIG. 4. The support element 40 comprises, in its entirety, four concentric rings, 41, 42, 43, 44, interconnected by means of radial branches 45.

As described above, the support element 40 is equipped with a large quantity of orifices 46 distributed over the surface of said support element 40, and present on the four rings 41, 42, 43, 44 and the intermediate branches 45. According to the invention, each orifice 46 is adapted to accommodate a light source of a second group of light sources present in a spotlight. FIG. 9 clearly illustrates the structural aspects of the assembly composed of the light sources and the support element 40. FIG. 5 shows that on its upper face, the various components of the support element 40 are gutter-shaped. Said gutters are adapted to receive, together, the group of longitudinal light guides 18 visible in FIG. 3. First of all, this offers the possibility of correctly positioning and fixing the lower face of the optical element 10 to the upper face of the support element 40. If the optical element 10 is correctly positioned on the support element 40, and thanks to the presence of the longitudinal light guides 18 and the gutters formed on the support element 40, said support element 40 and the optical element 10 can no longer move in relation to each other. The presence of gutters on the upper face of the support element 40 offers another advantage, by means of which the walls forming said gutters act as light shutters. This prevents said light emitted by the second group of light sources from reaching the inside of the lenses 20. This aspect is illustrated in more detail in FIG. 9.

FIG. 6 represents the grille 30 as a whole. The basic shape of said grille 30 is comparable with the basic shape of the support element 40. The grille 30 comprises four concentric circles 31, 32, 33, 34 interconnected using the branches 35. On its lower face, as shown in FIG. 7, the grille 30 is essentially flat. On its upper face, as shown in FIG. 6, the grille 30 presents an undulating shape, making it possible to better cover the lenses in the inter-lens spaces, as illustrated in FIG. 1. For reasons of exhaustiveness, it should be noted that the grille 30 is equipped with circular elements 31 making it possible to cover the outside of the lenses 20 situated in the biggest circle. This means that the circular element 31 is not used to bridge inter-lens spaces, but to bridge spaces around the lenses situated outward-most on the optical assembly 100 of the invention.

FIG. 7 represents the lower face of the grille 30. At a certain distance, it appears that the lower face 30, as illustrated in FIG. 7, is essentially flat. According to a particular embodiment, illustrated in FIG. 7 and represented in more detail in FIG. 8, it can be observed that the lower surface of the grille 30 presents a built-in diffusing texture. The objective of said built-in diffusing texture is to diffuse as much as possible the light emerging from the outlet surface of the inter-lens spaces of the optical element 10, as soon as the light penetrates said grille 30 via its lower surface. The diffusion obtained thanks to the diffusing texture, as illustrated in FIG. 7 and more clearly visible in FIG. 8, is a greater diffusion of the light generated by light sources within the second group of light sources of a spotlight. In other words, on the upper face of the grille 30, the light is not diffused in the form of individual beams, but the diffusion makes it possible to obtain a more global light effect. In fact, it is possible to prevent light being concentrated on a few points on the upper face of the grille 30 using the built-in diffusing texture, as illustrated in FIGS. 7 and 8. The resulting optical effect is that you obtain a more diffuse light instead of obtaining a so-called "hot spot" concentration of light, and thereby an improved optical effect.

FIG. 9 represents a cross-sectional view of various elements in a spotlight equipped with an optical assembly 100.

First of all, FIG. 9 represents a printed circuit 60. It is possible to use a first printed circuit (not visible in FIG. 9) in order to fix a first group of light sources, such as power light-emitting diodes (LEDs) (not visible in FIG. 9), adapted with lenses 20, and a second printed circuit for a second group of light sources 61, such as signage light-emitting diodes (LEDs), adapted to be accommodated inside the orifices 46 of the support element 40. It is not possible to use the same printed circuit to fix the first group of light sources and the second group of light sources. The second printed circuit has the same shape as the grille 40. According to the example illustrated in FIG. 9, the second group of light sources 61 is equipped with light-emitting diodes (LEDs) 61 in the form of SMC light-emitting diodes (surface-mounted component LEDs). More particularly, it is possible to use signage light-emitting diodes (LEDs). It should be noted that it is difficult to incorporate a high number of LEDs with the control system on the small surface situated on the second printed circuit (same shape as the grille 40).

FIG. 9 illustrates the support element 40, positioned in an orifice 46, said support element 40 enabling production of light using the SMC light-emitting diodes (LEDs) 61, which flows through the support element 40 in the direction of the spotlight outlet (FIG. 9 illustrates the bottom-up movement of the light). The support element 40 is equipped, on the side opposite the orifice 46, with walls 47, 48 forming together a mask making it possible to guide the light generated by the SMC light-emitting diodes (LEDs) 61 in the direction of the optical element 10 and prevent light from leaking to the lenses 20. For the purposes of clarity, only two parts of the lenses 20 are represented in FIG. 9. For this function, the support element 40 is made from an opaque material, preferably a black opaque material, for any light not collected by the convergent profile 80 of the rib 18 of the optical element 10. It should be recalled that the walls 47, 48 jointly form the gutters, as described above with reference to FIG. 5. The convergent surface 80 is the surface directed toward the SMC light-emitting diodes (LEDs) of the rib 18, as described with reference to FIG. 3. As illustrated in FIG. 9, by means of the convergent surface 80, the light emanating from the light-emitting diodes (LEDs) 61 is channeled and directed toward the outlet surface of the inter-lens spaces 81 of the optical element 10. The light diffusion continues in the direction of the outlet surface of the inter-lens spaces 81, and penetrates inside the grille 30. For reasons of clarity, said grille 30 is not represented in FIG. 9.

The invention claimed is:

1. An optical assembly for a spotlight, comprising:
    an optical element equipped with a set of lenses, the lenses being adapted to cooperate with a first group of light sources for the spotlight, wherein the lenses are adapted to generate primary light beams and are spaced apart from one another using inter-lens spaces;
    a grille for filling at least part of the inter-lens spaces of the set of lenses, adapted to cooperate with a second group of light sources for the spotlight, wherein the grille is adapted to generate a secondary light effect; and
    a support element, adapted to support the set of lenses, in the inter-lens spaces, wherein the support element includes orifices located in the inter-lens spaces, the light sources in the second group of light sources are positioned to emit light through the orifices, and the orifices guide the light to exit the assembly via the grille in the inter-lens spaces and prevent light from leaking through the lenses;
    wherein the grille and support element are adapted to be superimposable by enclosing the optical element between an inner face of the grille and an upper face of the support element, and thereby fix the set of lenses in order to form the optical assembly.

2. The optical assembly according to claim 1, wherein the grille is adapted to surround each lens in the set of lenses.

3. The optical assembly according to claim 1, wherein the grille comprises a transparent plastic material.

4. The optical assembly according to claim 1, wherein the grille, on a face directed towards the second group of light sources, comprises a built-in diffusing texture making it possible to obtain a diffuse light effect.

5. The optical assembly according to claim 1, wherein the lenses are shaped to together form a disc.

6. The optical assembly according to claim 1, wherein the optical element comprises at least two modules, each module comprising at least one lens.

7. A spotlight comprising a first group of light sources, adapted to cooperate with a set of lenses to generate primary light beams, the spotlight lenses being spaced apart from one another using inter-lens spaces, and a second group of light sources, adapted to cooperate with a grille present in the inter-lens spaces to generate a secondary light effect, wherein the spotlight comprises the optical assembly according to claim 1.

8. An optical assembly for a spotlight, comprising:
    an optical element equipped with a set of lenses, the lenses being adapted to cooperate with a first group of light sources for the spotlight wherein the lenses are adapted to generate primary light beams and are spaced apart from one another using inter-lens spaces;
    a grille for filling at least part of the inter-lens spaces of the set of lenses, adapted to cooperate with a second group of light sources for the spotlight, wherein the grille is adapted to generate a secondary light effect; and
    a support element, adapted to support the set of lenses, in the inter-lens spaces;
    wherein the grille and support element are adapted to be superimposable by enclosing the optical element between an inner face of the grille and an upper face of the support element, and thereby fix the set of lenses in order to form the optical assembly, wherein the support element comprises an opaque material, and comprises orifices for housing the light sources of the second group of light sources, the support element thereby forming a mask for the light sources.

* * * * *